United States Patent
Stoor

[11] Patent Number: 5,238,615
[45] Date of Patent: Aug. 24, 1993

[54] METHOD FOR JOINING TOGETHER OF TUBULAR PLASTIC PRODUCTS
[75] Inventor: Ralf Stoor, Vasa, Finland
[73] Assignee: OY Muotekno AB, Vasa, Finland
[21] Appl. No.: 659,396
[22] PCT Filed: Aug. 23, 1989
[86] PCT No.: PCT/FI89/00153
§ 371 Date: Feb. 22, 1991
§ 102(e) Date: Feb. 22, 1991
[87] PCT Pub. No.: WO90/02038
PCT Pub. Date: Mar. 8, 1990
[30] Foreign Application Priority Data
Aug. 23, 1988 [FI] Finland ................ 883885
[51] Int. Cl.⁵ .............................................. B29C 45/14
[52] U.S. Cl. .......................................... 264/25; 29/460; 249/78; 264/262; 264/265
[58] Field of Search ............... 264/262, 263, 25, 265; 249/78; 29/460

[56] References Cited
U.S. PATENT DOCUMENTS

| | | | |
|---|---|---|---|
| 3,378,672 | 4/1968 | Blumenkranz | 264/262 |
| 3,561,795 | 2/1971 | Becher | 264/263 |
| 3,686,375 | 8/1972 | Hall | 264/262 |
| 3,970,735 | 7/1976 | Nelson | 264/263 |
| 4,025,600 | 5/1977 | Parr | 264/262 |
| 4,145,176 | 3/1979 | Nelson | 249/78 |
| 4,153,656 | 5/1979 | Bunyan | 264/262 |
| 4,360,961 | 11/1982 | Chlebowski | 29/460 |
| 4,529,568 | 7/1985 | Benedini | 264/262 |
| 4,725,165 | 2/1988 | Langran | 264/263 |
| 4,876,041 | 10/1989 | Hanselka | 264/25 |
| 4,923,659 | 5/1990 | Kunz | 264/25 |

Primary Examiner—Jan H. Silbaugh
Assistant Examiner—Brian J. Eastley
Attorney, Agent, or Firm—McGlew and Tuttle

[57] ABSTRACT

A method for joining together tubular plastic products (1, 2) by heating the joint faces of the plastic products (1, 2) which have been chamfered at least partly in advance, and by passing molten plastic material into the space (4), that is formed between the opposite joint faces. The fixing of the tubular plastic products (1, 2) and the feed of the molten plastic material take place with the aid of a mold tool (5) which is applied onto the space (4), and molten plastic material is passed rapidly into the hollow space between the mold tool, (5) and the joint faces through a feed stub (6) provided in the mold tube.

7 Claims, 2 Drawing Sheets

METHOD FOR JOINING TOGETHER OF TUBULAR PLASTIC PRODUCTS

FIELD OF THE INVENTION

The present invention concerns a method and a device for joining together of tubular plastic products by fitting and fixing these in the desired position on the support of an inner tube or a provisional support sleeve, by heating the joint faces of the plastic products, which have been chamfered at least partly in advance, to the melting point of the plastic material, and by passing molten plastic material into the space that is formed on the fitting together between the opposite joint faces.

BACKGROUND OF THE INVENTION

Prior-art methods of this type are based on the so-called extruder weld principle, according to which a strand of molten plastic material from an extruder nozzle is gradually fed into a groove of preferably V-section, which is formed between the tubular plastic products to be joined together. During the welding the extruder nozzle must be passed along the groove substantially at the same speed as the strand of plastic mix is pressed out of the extruder nozzle. In order that a tight and reliable joint could be obtained, complete synchronization must prevail between the feeding velocity of the plastic mix and the extruder nozzle. The extruder may be either shaped as a hand tool, in which case high professional skill is required, or it may be mounted on a welding machine, wherein the feeding of the plastic mix and the drive of the tubular plastic product or of the extruder nozzle take place completely automatically. It is a drawback of extruder welding that it is very slow and requires relatively complicated equipment if the work is to be carried out mechanized.

In particular in the case of installation of insulated offshore pipelines which comprise an inner metal pipe for transfer of medium and a coextruded protective and insulating layer of plastic surrounding the metal pipe, it is required that the welding of the protective and insulating layer must not take a longer time than the welding together of two metal pipes. The protective and insulating layer comprises an inner foamed plastic material, such as foamed polyolefin or equivalent, and an outer protective mantle of a smooth and liquid-tight plastic, likewise polyolefin or some other weldable plastic. The pipeline is prefabricated in certain lengths with just a little portion at each end free from the surrounding protective and insulating layer to permit welding together of the metal pipes. On completion of the welding, the platform on which the work is performed is driven forwards along the length of the pipeline piece, whereby the newly welded joint arrives at the station at which the joint is to be provided with a protective and insulating layer similar to that surrounding the rest of the pipeline. For this purpose it is possible to utilize prefabricated cylindrical, axially split-open joint pieces with chamfered edges, which joint pieces must be fixed by welding with absolutely liquid-tight seams, two peripheral circular seams along the ends of the joint piece and one axial straight seam along the split slot of the joint piece.

With extruder welding there is no chance to attain a welding speed that is required to keep pace with the metal pipe welding.

SUMMARY AND OBJECTS OF THE INVENTION

The object of the present invention is to eliminate all of the above problems, which is accomplished by means of a method that is characterized in that the fixing of the tubular plastic products and the feed of the molten plastic material take place with the aid of a mould tool which is applied onto the space between the plastic products that are to be joined together, and the molten plastic material is passed rapidly under pressure into the hollow space between the mould tool and the joint faces through a feed stub provided in the mould tool, whereupon the plastic material is cooled and the mould tool and an inner support bushing, if any, are removed

BRIEF DESCRIPTION OF THE DRAWINGS

In the following, the invention will be described in more detail with reference to the accompanying drawing, wherein.

DETAILED DESCRIPTION OF THE INVENTION

Figure 1:
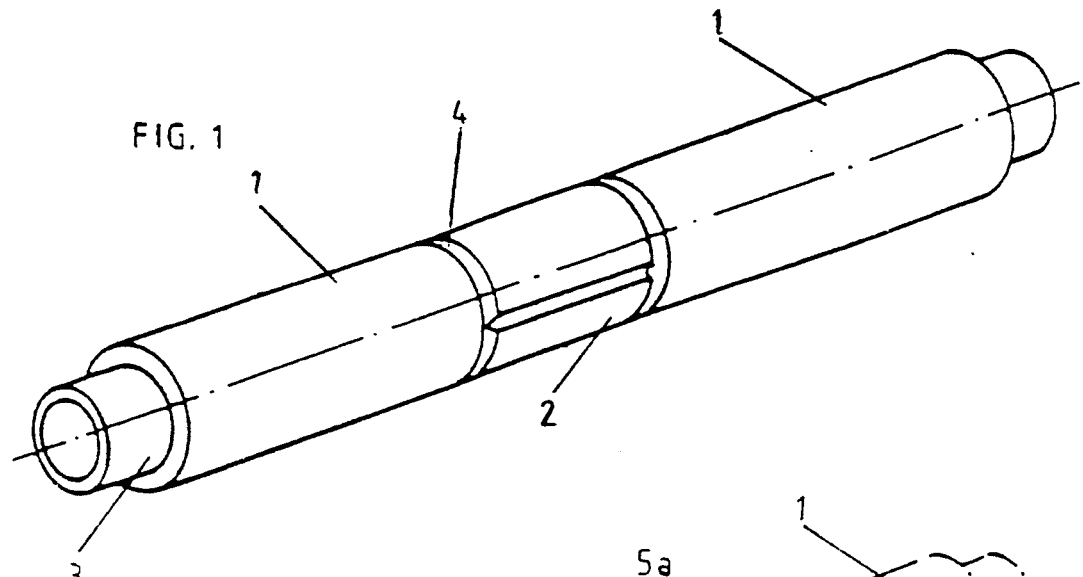
FIG. 1 shows an exemplifying embodiment of a tubular plastic product which is suitable for the present invention.
Figure 2:
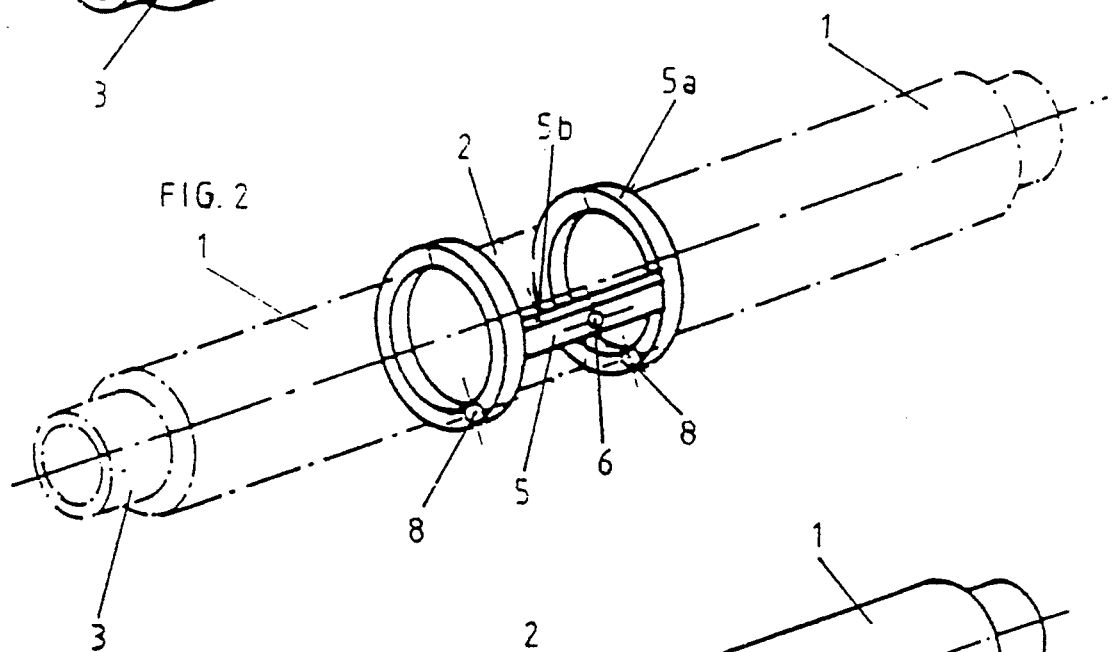
FIG. 2 shows an exemplifying embodiment of a device in accordance with the invention that is suitable for joining together of the plastic product of FIG. 1.
Figure 3:
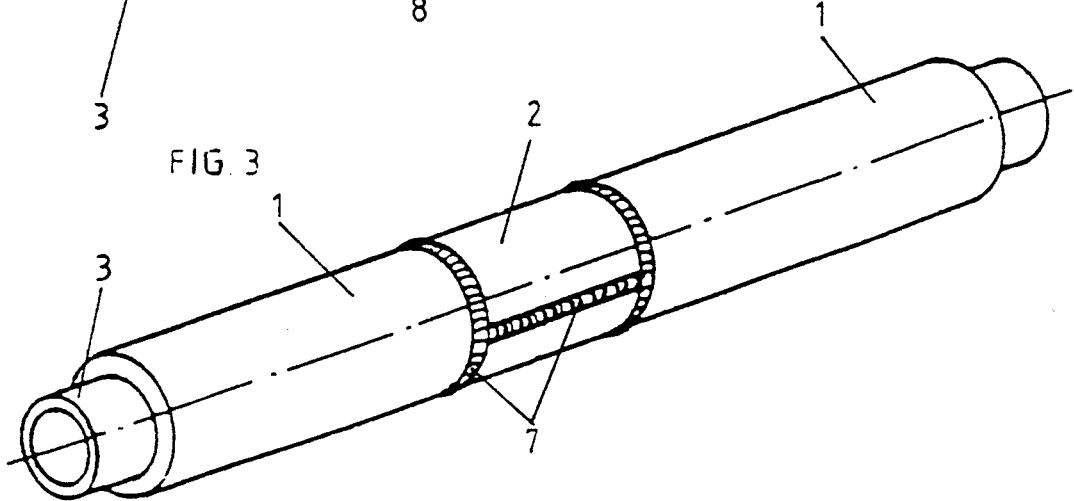
FIG. 3 shows a plastic product joined together by means of the device shown in FIG. 2.
Figure 4:
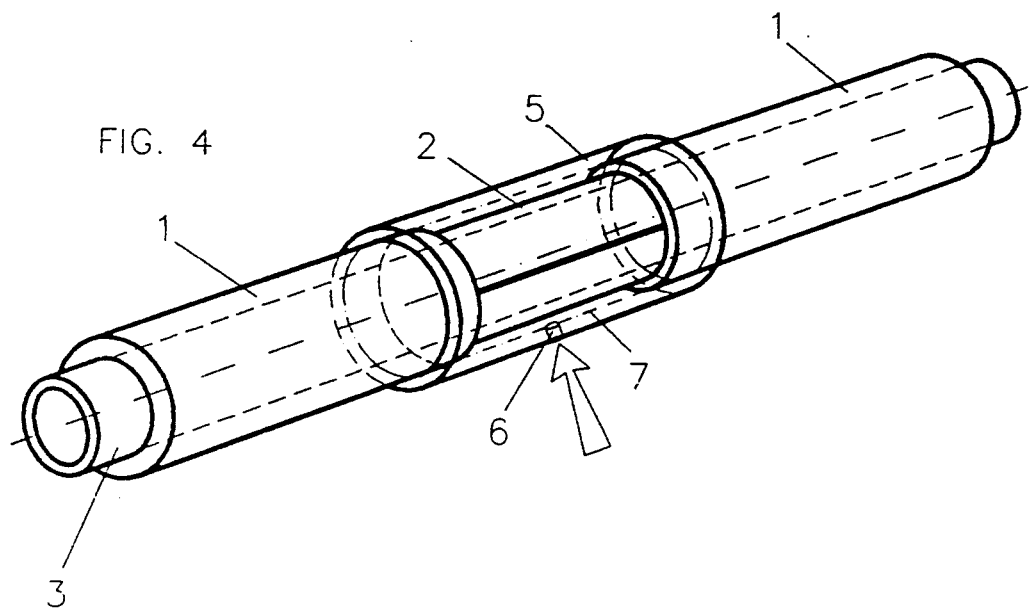
FIG. 4 shows another example of joining together in accordance with the invention.
Figure 5:
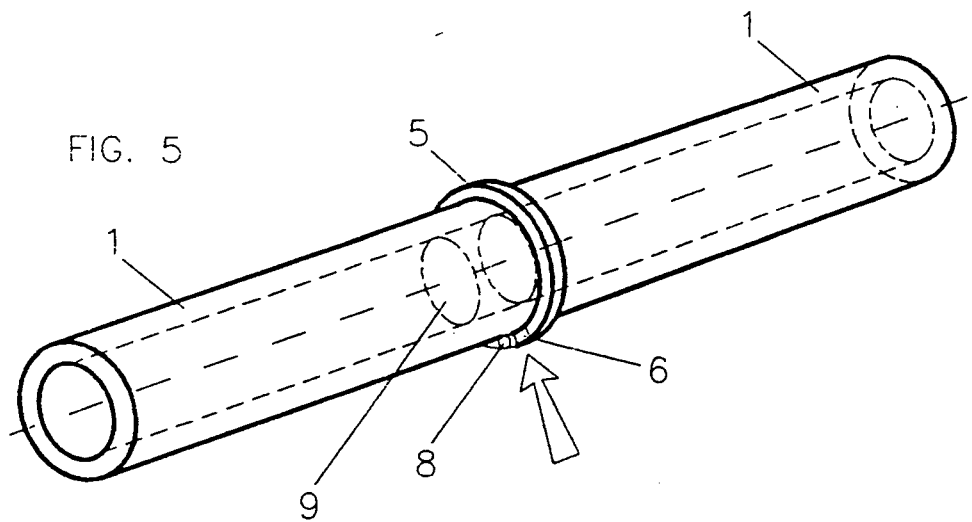

When tubular plastic products, such as plastic tubes, split-open joint pieces 2 on joints in the case of metal pipes 3 provided with protective and insulating layers 1, or possibly tube halves, are joined together, according to the present invention, first the plastic products 1, 2 are fitted and fixed in the desired position supported by an inner pipe 3 or by a provisional support bushing after all of the joint faces have been worked, i.e. chamfered so that a groove 4 of substantially V-section is formed for each seam, as comes out, e.g., from FIG. 1. Thereupon the chamfered joint faces are heated to the melting point of the plastic material in a suitable way either before or after a mould tool 5 is applied onto the V-section grooves 4. The function of the mould tool 5 is to fix the tubular plastic products 1, 2 to be joined together, on one hand, and to enclose the grooves 4 tightly and to form a mould for the molten plastic material that is, upon completed heating of the joint faces, rapidly injected into the V-section grooves 4 through at least one feed stub 6 provided on the mould tool 5, on the other hand. As soon as the entire hollow space 4 is filled with plastic mix, the cooling is started, e.g., by means of cold air. During the initial stage of the cooling, some more plastic mix is still pressed into the hollow space in order to prevent formation of cavities in the seam 7 that is formed. After the surface of the plastic mix in the seam 7 formed has solidified, the mould tool 5 and the inner, preferably collapsible support bushing, if the latter has been used during the process of joining together, are removed. By means of this method, a uniform and high-quality seam 7 is obtained extremely rapidly and simply.

The mould tool 5 is provided with an inner mould face of substantially concavely circular arcuate section, which determines the outer contour of the seam 7 to be formed. The feed stub 6 in the mould tool should be placed as centrally as possible in relation to the end portions of the mould tool 5 so that the molten plastic mix reaches the portions of the hollow space between the joint faces and the mould tool 5 that are most distant from the feed stub 6 approximately at the same time. The molten plastic mix is passed to the feed stub 6, e.g., through a supply pipe (not shown). At the point or points of the mould tool 5 that is/are placed most distant from the feed stub 6, one or more control openings (not shown) are provided, through which molten plastic material is supposed to be extruded as an indication to the effect that the hollow space between the mould tool 5 and the joint faces is full.

The heating of the joint faces may take place in a number of different ways, either before or after the mould tool 5 is applied. If the heating takes place before the mould tool is applied, it can be carried out, e.g., by means of a tightly fitting heating tool, which is either heated in advance or is provided with heating members and which is placed into the V-section groove 4 between the joint faces during the heating stage. After the joint faces have reached their melting temperature, the heating tool is removed and the mould tool 5 is applied.

However, a simpler procedure is to carry out the heating only after application of the mould tool 5. In this case the heating may take place either by means of a heated gaseous medium, which is injected into the hollow space between the mould tool 5 and the joint faces through the feed stub 6 or through a separate connection, or by means of radiation heat from a resistor wire in the mould tool.

The mould tool 5 has preferably a substantially U-shaped cross-section, and it is provided with a transverse articulated joint 8 for closing and opening of the mould tool 5. If the mould tool is supposed to be used for joining together of two tube ends, it has an annular shape and the feed stub 6 is fitted at the proximity of the transverse articulated joint 8.

An advantageous embodiment is obtained thereby that the mould tool is shaped as a flexible metal band, whose ends are provided with locking members for locking of the mould tool in the working position around the tubular plastic products to be joined together.

When the mould tool is intended for joining together of a split-open joint piece 2 between the protective and insulating layers 1 on two metal pipes 3 welded together in a pipeline for offshore, district-heating, or similar use, the mould tool 5 comprises two parallel portions 5a, which are supposed to enclose peripheral grooves 4 of their own, and one transverse portion 5b fitted between them for an axially directed groove 4. The connection stub 6 is appropriately fitted at the middle point of the transverse portion 5b.

In order that the mould tool should be suitable for joining together of joint pieces of different lengths, the transverse portion 5b is appropriately telescopic.

When a protective and insulating layer is applied onto a weld area between two metal pipes in a pipeline for offshore or district-heating use, according to the present invention, it is also possible to omit the joint piece 2 completely and, in stead, to use a wider band-shaped mould tool 5 which covers the entire joint area. In order to reduce the quantity of molten plastic material that is to be injected in this connection, before application of the mould tool 5 it is possible to place a splitopen tubular filler piece 2a in the space around the weld area, said filler piece having a thickness inferior to that of the protective and insulating layer 1, which results in the circumstance that, in connection with the injection of the plastic mix, the filler piece 2a becomes completely baked-in in the wide joint 7 that is formed.

What is claimed is:

1. A method for joining together weldable tubular plastic products of plastic material surrounding an inner metal pipe, comprising the steps of:
   fixing two tubular plastic products in a position with joint faces in opposed relation;
   chamfering the joint faces to provide adjacent, at least partially chamfered joint faces defining a v-section groove;
   heating said joint faces to a melting point of the plastic material;
   applying a mould tube around the opposed joint faces of the two tubular plastic products to be joined;
   feeding molten weldable plastic rapidly to at least one feed stub in the mould tube, said feed stub being in alignment with said v-section groove for feeding the molten weldable plastic into a space formed inside the mould tube between the joint faces in opposed relation;
   cooling the weldable plastic; and
   removing the mould tube;

2. A method according to claim 1 wherein:
   said step of heating takes place by means of a heated gaseous medium which is injected into the hollow space between the mould tube and the joint faces.

3. A method according to claim 1, wherein:
   said step of heating takes place by means of a tightly fitting heating tool, which is placed into the space or groove between the joint faces during the heating stage and which said heating tool must be removed before the moulded tube is applied.

4. A method according to claim 1, wherein:
   said step of heating takes placed by means of radiation heat from a resistor wire in the mould tube.

5. A method for joining together weldable tubular plastic product of plastic material surrounding an inner metal pipe connection, comprising the steps of:
   fixing the tubular plastic products with joint faces of the tubular plastic products spaced a predetermined distance;
   chamfering the joint faces of the tubular plastic products to form at least partially chamfered joint faces;
   positioning a tubular split-open filler piece of weldable plastic material around said inner metal pipe connection, between said at least partially chamfered joint faces;
   heating said joint faces to a melting point of the plastic material;
   applying a mould tube around the opposite ends of the two tubular plastic products to be joined with a feed stub of said mould tue in a central portion;
   feeding molten weldable plastic rapidly to said feed stub in the mould tube for feeding the molten weldable plastic into a space formed inside said mould tube and defined by the joint faces and an outer surface of the filler piece;
   cooling the weldable plastic; and
   removing the mold tool.

6. A method for joining together weldable tubular plastic products of plastic material with protective and insulating layers coextruded around prefabricated metal pipes of certain lengths to be used in a pipeline for offshore or district-heating, comprising the steps of:

fitting and fixing the tubular plastic products in a desired position by means of the metal pipes, said plastic products having at least partly chamfered joint faces;

applying a joint piece, comprising a cylindrical protective and insulating layer having an axial split, around a welded joint area in a pipeline, and forming two peripheral circular grooves positioned at each end of the joint piece, as well as an axial groove along said axial split;

heating the joint faces in said grooves to a melting point of the plastic material;

applying a mould tool around opposite end faces of the tubular plastic products to be joined;

feeding molten weldable plastic rapidly through at least one feed stub in the mould tool into a space formed inside the mould tool between the opposite joint faces;

cooling the weldable plastic; and removing the mould tool.

7. A method for joining together weldable tubular plastic products of plastic material with protective and insulating layers coextruded around prefabricated metal pipes of certain lengths to be used in pipeline for offshore or district-heating, comprising the steps of:

fitting and fixing the tubular plastic products in a desired position by means of the metal pies, said plastic products having at least partly chamfered joint faces;

applying a tubular split-open filler piece of weldable plastic material around a welded joint of the metal pipe, said filler piece having a thickness inferior to that of the protective and insulating layers of the metal pipe;

heating the joint faces of the tubular plastic products to a melting point of the plastic material;

applying a mould tool, said mould tool being a wide flexible metal band, around an entire joint area intervening opposite end faces of the tubular plastic products to be joined;

feeding molten weldable plastic rapidly through at least one feed stub in the mould tool into an annular space defined by an inner mantle of the mould tool, the end faces of the protective and insulating layers and an outer mantle of the filler piece;

cooling the weldable plastic; and removing the mould tool.

* * * * *